(12) United States Patent
Van Wiemeersch et al.

(10) Patent No.: US 9,405,944 B2
(45) Date of Patent: Aug. 2, 2016

(54) MITIGATION OF LF INTERFERENCE FROM ADJACENT VEHICLES ALSO USING LF APPROACH DETECTION SYSTEM

(71) Applicant: FORD GLOBAL TECHNOLOGIES, LLC, Dearborn, MI (US)

(72) Inventors: John Robert Van Wiemeersch, Novi, MI (US); Kevin Thomas Hille, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 13/870,049

(22) Filed: Apr. 25, 2013

(65) Prior Publication Data
US 2014/0320260 A1    Oct. 30, 2014

(51) Int. Cl.
*G05B 19/00* (2006.01)
*G06K 7/10* (2006.01)
*G07C 9/00* (2006.01)

(52) U.S. Cl.
CPC ........ *G06K 7/10069* (2013.01); *G07C 9/00309* (2013.01); *G07C 2009/00388* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 5,809,397 A * | 9/1998 | Harthcock | H04B 7/2125 455/13.2 |
| 6,801,134 B1 | 10/2004 | Juzswik | |
| 8,138,894 B2 | 3/2012 | Kato et al. | |
| 8,232,897 B2 | 7/2012 | Tieman et al. | |
| 8,284,020 B2 | 10/2012 | Ghabra et al. | |
| 8,319,616 B2 | 11/2012 | Girard, III et al. | |
| 2006/0030268 A1 * | 2/2006 | Teshima | B60R 25/245 455/63.1 |
| 2006/0202798 A1 | 9/2006 | Baumgartner et al. | |
| 2006/0226952 A1 | 10/2006 | Baumgartner et al. | |
| 2007/0109093 A1 | 5/2007 | Matsubara et al. | |
| 2009/0212906 A1 | 8/2009 | Michel et al. | |
| 2012/0062358 A1 | 3/2012 | Nowottnick | |
| 2012/0179306 A1 | 7/2012 | Saiki et al. | |
| 2014/0285319 A1 * | 9/2014 | Khan | G07C 9/00309 340/5.61 |

FOREIGN PATENT DOCUMENTS

JP    2005113608 A    4/2005
WO    9816849 A1    4/1998

OTHER PUBLICATIONS

Search Report Under Section 17(5), GB1403872.3, Aug. 29, 2014, 4 pages, Intellectual Property Office of Great Britain.

* cited by examiner

*Primary Examiner* — Ojiako Nwugo
(74) *Attorney, Agent, or Firm* — Frank A. MacKenzie; Brooks Kushman P.C.

(57) ABSTRACT

A system may include at least one antenna and a controller in communication with the antenna. The controller may be configured to establish a pattern for transmitting low frequency challenges; and instruct the first antenna to transmit the low frequency challenges based on the established pattern.

18 Claims, 3 Drawing Sheets

MITIGATION OF LF INTERFERENCE FROM ADJACENT VEHICLES ALSO USING LF APPROACH DETECTION SYSTEM

BACKGROUND

Vehicles may use low frequency (LF) polling to detect the approach of a customer with a key fob provided for passive entry to the vehicle based on a recognized response from the key fob. However, other vehicles may park relatively close to polling vehicle and may also implement similar technologies. The LF signals transmitted from each vehicle may collide with the signals of another. That is, signals may overlap, causing the low frequency challenges to become corrupt and possibly unrecognizable by the key fob's receiver.

In an effort to avoid these corruptions and collisions, some systems use relatively short challenges at a higher polling rate. However, these signals may be difficult for the key fob's receiver to detect. Other systems may use longer challenges so that in the event of collision, some portion of the signal may survive and be recognizable by the key fob. However, these systems may occupy large amounts of 'air space' and be relatively unpredictable as to the collision probabilities. Additionally, longer LF challenges from the vehicle consume significantly greater current which may degrade the vehicle battery state of charge required for cranking. As such, there is a need for a proximal scanning system that actively avoids collision from other low frequency signals.

SUMMARY

A system may include at least one antenna and a controller in communication with the antenna. The controller may be configured to establish a pattern for transmitting low frequency challenges; and instruct the first antenna to transmit the low frequency challenges based on the established pattern.

A method may include receiving, at a computing device of a first vehicle, a signal from a second vehicle, determining a sequence of the received signal, establishing a pattern for transmitting low frequency challenges based on the sequence of the received signal, wherein the low frequency challenges avoid the determined sequence of the received signal; and instructing the first antenna to transmit the low frequency challenges based on the established pattern.

A method may include receiving, at a computing device of a first vehicle, a signal from a second vehicle, determining a location attribute of the second vehicle based on the received signal, determining whether the location attribute exceeds a predefined threshold, and in response to the location attribute exceeding the predefined threshold, establishing a pattern for transmitting low frequency challenges.

DETAILED DESCRIPTION

Figure 1:
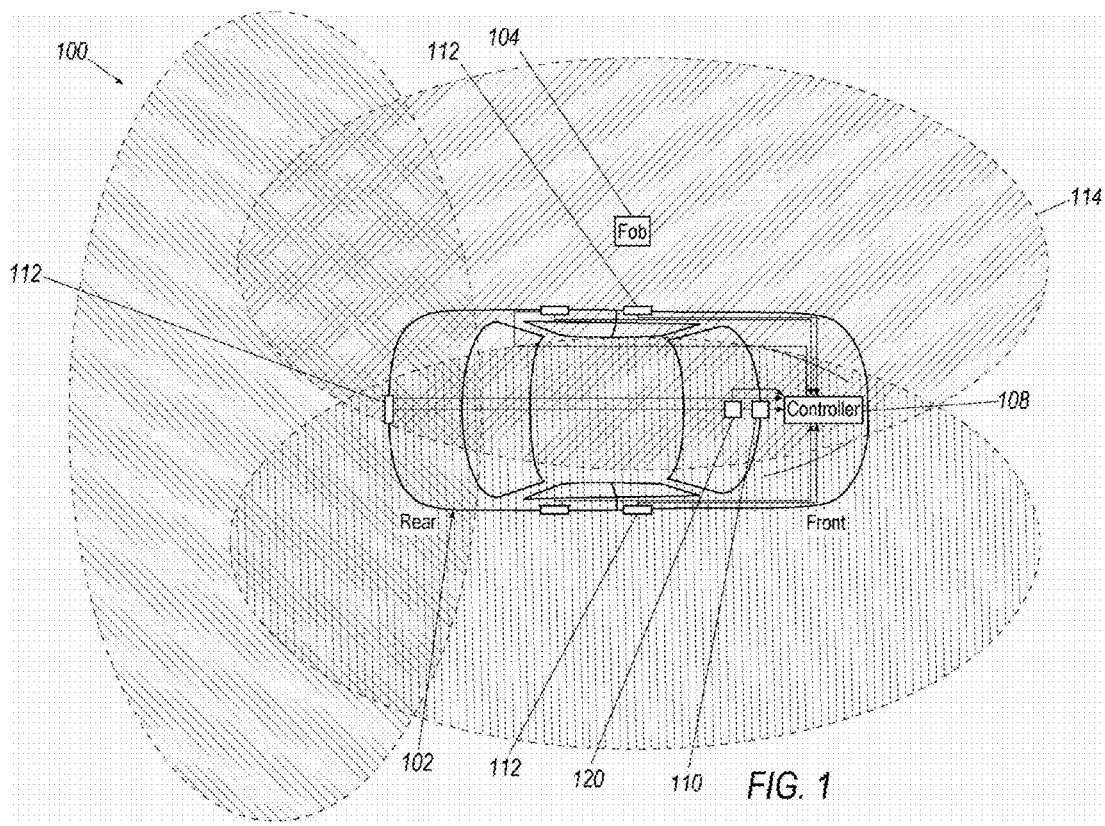
FIG. 1 is an exemplary proximity scanning system for a vehicle.

FIG. 1 illustrates an exemplary system 100 of a vehicle 102 for passive key entry, such as passive keyless entry/passive start (PEPS) system. The system 100 may take many different forms and may include multiple and/or alternate components and facilities. While an exemplary system 100 is shown in FIG. 1, the exemplary components illustrated in system 100 are not intended to be limiting. Indeed, additional or alternative components and/or implements may be used.

In a PEPS system, an owner may carry an electronic transmission device, such as a PEPS key fob 104, to allow for "keyless" entry to the vehicle 102. To initiate a door unlock sequence, the owner may touch or move in close proximity to a PEPS sensor of a vehicle 102. Upon an identification of the potential presence of an owner by a sensor, a controller 108 of the vehicle 102 may initiate a challenge-accept sequence with the key fob 104. The sequence may include the controller 108 sending a low-frequency key wake-up challenge message to the key fob 104, and listening for a high-frequency response from the key fob 104 including an identification code. Upon receipt of the correct identification code, the vehicle controller 108 may then unlock the vehicle 102 doors, or otherwise prepare the vehicle for the driver.

The PEPS capabilities may provide several keyless functions to a user including passive engine start, engine shut off, passive lock, etc. The controller 108 and the key fob 104, as explained, may communicate with each other. The key fob 104 may include a transponder configured to operate as a radio-frequency identification (RFID) tag paired to the controller 108. In order gain access to the vehicle 102 via unlocking the doors, the controller 108 may wake up periodically in order to establish a communication between the key fob 104 and the controller 108. For example, the user may touch or toggle a handle of a door of the vehicle 102 or push the start button which are all recognized by the controller 108. Once the controller 108 has woken up, the controller 108 may transmit a low frequency signal to the key fob 104. The key fob 104 may then respond with a high frequency signal. Thus, the key fob 104 and the controller 108 may perform a "handshake" before the request is executed.

Additionally or alternatively, the system 100 may include a proximal scanning feature where one or more antennas 110, 112 may be instructed to search for approaching key fobs 104 at periodic intervals. An antenna 110, 112 may be configured to transmit low frequency challenges (typically 125 kHz) at predefined intervals or polling rates (e.g., 200-800 ms). The antenna, such as antenna 110, may be located within the vehicle 102, as shown in FIG. 1. Additionally or alternatively, several exterior antennas, such as antennas 112, may be included around the vehicle 102. In one example, exterior antennas 112 may be included in one or more of the door handles of the vehicle 102.

The low frequency transmissions from the antennas 110, 112 may create low frequency zones 114 around the vehicle 102. The zones 114 may have a radius of approximately 1-3 meters from the antennas 110, 112 and can to be oval in shape, as shown in FIG. 1. When a key fob 104 enters the zone 114 the key fob's transceiver may detect the challenge transmitted by the respective antenna 110, 112 and respond back with a designated high frequency response (typically 315 MHz or 901 MHz in North America.) While the figures show a plurality of zones 114 created by antennas 112, one radial zone may be created by antenna 110.

The antenna 110, 112 may be instructed by the controller 108 to transmit the challenges periodically in a continuous pattern or for a specified duration with a continuous or modified pattern. The challenges may commence after a trigger event has been detected by the controller 108. The trigger event may be any event where PEPS capabilities may be implemented. For example, the trigger event may include turning off the vehicle 102. The trigger event may also including locking the vehicle 102, or closing the vehicle door. Thus, when a driver has parked and left the vehicle 102, upon his or her return, the key fob 104 may respond to a challenge from the antenna 110, 112 in order to illuminate the vicinity of the vehicle, perform some other application specific feature related to welcoming the customer, or unlock the vehicle 102 without active driver participation.

Figure 2:
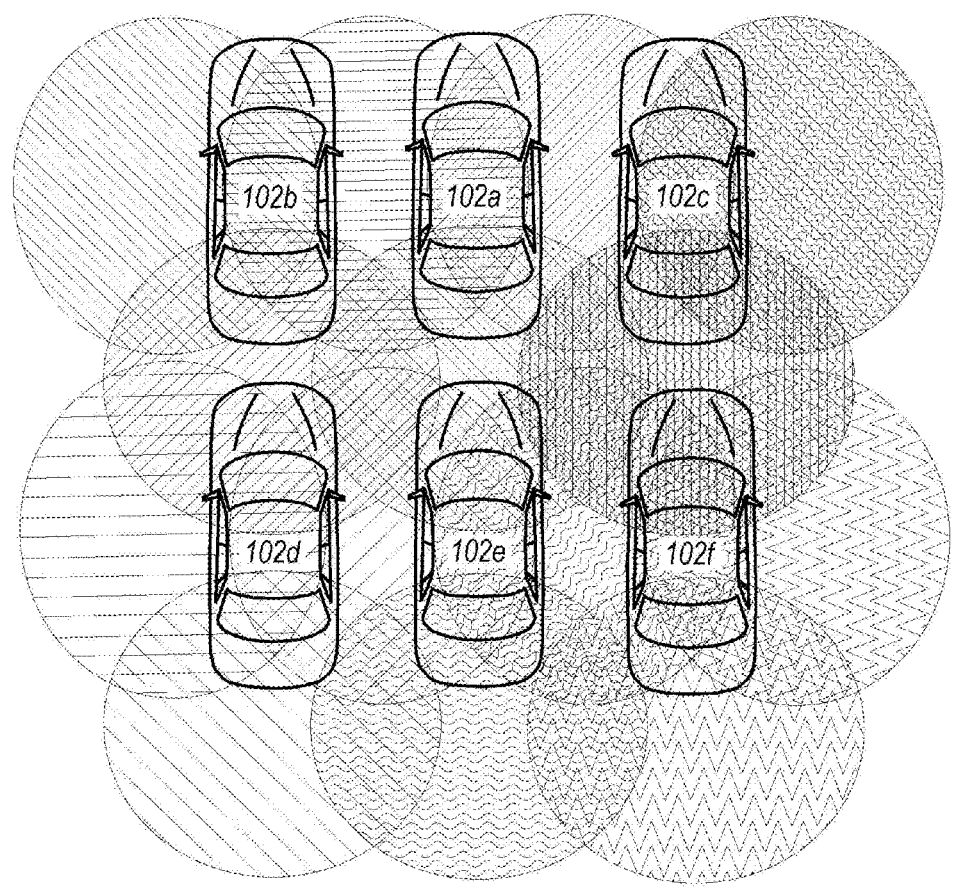
FIG. 2 is an exemplary collision diagram.

However, in referring to FIG. 2, problems may occur when multiple vehicles 102 having proximal scanning systems and are within close proximity to one another. These other vehicles may be of the same brand and model or of different brands from competing manufacturers. For example, several vehicles 102a-f in a parking lot may have PEPS capabilities and may transmit various low frequency signals in order to challenge approaching key fobs 104. Each of these vehicles 102a-f may create an associated set of zones 114, each of which may overlap a portion of another zone of another vehicle. Each of the zones 114 may exceed the spacing between the parked vehicles 102a-f. Thus, the antennas 110, 112 of one vehicle 102 may detect the low frequency signals/ challenges from another vehicle. The low frequency challenges of each adjacent vehicle may be asynchronous to each other. That is, the challenges may collide and result in cancellation or corruption of one or more of the challenges. Such collisions may result in one or more of the low frequency challenges not being recognized by the key fob 104 and thus either slowing down the recognition response time until the customer moves to a position closer to their vehicle (where the LF signal from their vehicle becomes the dominate LF signal seen by the key fob), or in a worst case scenario, rendering the PEPS system inoperable.

Figure 3:
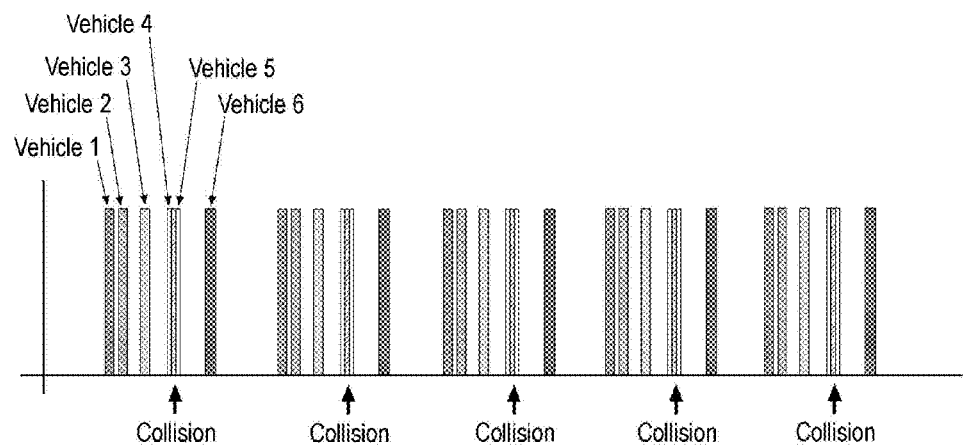
FIG. 3 is an exemplary collision chart.

In one example, a polling rate of 600 ms may be used. That is, low frequency challenges may be transmitted every 600 ms. Each challenge may last for approximately 29 ms. If a targeted vehicle 102 has a zone 114 that overlaps with the zones of four other vehicles, it is possible that 145 ms (29 ms*5) of every 600 ms period could have low frequency signals that collide. That is, an antenna 110, 112 of one vehicle 102 could detect signals from any of the other vehicles having zones that overlap the associated zone 114 of the vehicle 102 approximately 24% of the time. Typically, the closest adjacent antennas will present the highest signal strength relative to an approaching key fob 104. Even if only two signals are detected, the antenna of the vehicle 102 associated with the approaching key fob 104, i.e., the targeted vehicle 102, may detect a large amplitude signal due to the two interfering signals. This amplitude may be possible in 9.6% of the 600 ms period due to the low frequency challenges from each vehicle interfering with one another (e.g., 2*29 ms/600 ms.) Moreover, as shown in FIGS. 2 and 3 where multiple overlaps occur among 6 vehicles, collision of the challenges may occur 29% of the time. (e.g., 6*29 ms/600 ms.)

FIG. 3 shows an exemplary illustration whereby at least two of the six signals overlap. In a perfect situation, the intervals at which each signal is transmitted would be evenly spaced from the other signals. However, this is unlikely without taking into account and coordinating the polling rates of the other vehicles. For such evenly spaced challenges to occur, each of the signal cycles would need to be offset by a predefined amount. For example, vehicle 102a may have a polling rate of 600 from an initial reference time of t=0. Vehicle 102b may then have a polling rate of 600 beginning at t=50. Vehicle 102c may have a polling rate of 600 at t=100, vehicle 102d may have a polling rate of 600 ms at t=150, vehicle 102e may have a polling rate of 600 ms at t=200 and vehicle 102f may have a polling rate of 600 ms at t=250. Thus, while each of the polling rates may be the same, each may have an offset from t=0 that differs from the other signals. In practice, it is unlikely that such signals would be evenly spaced, and as explained above, collision may occur up to 29% of the time in the above examples.

The controller 108 within the vehicle may be configured to alleviate or at least decrease the likelihood of collision among the challenges by controlling when a challenge is transmitted by the antenna 110, 112. The controller 108 may establish a pattern and instruct the antenna 110, 112 to transmit the low frequency challenges based on the pattern. The pattern may be established to avoid collision with other, surrounding vehicles having proximal scanning capabilities.

In one example, the pattern may be a random pattern. That is, the challenges may be delivered randomly without a consistent increment between the challenges. For example, a first challenge may be transmitted 1 ms after the trigger event. A second challenge may be transmitted 40 ms after that and a third challenge may be transmitted 60 ms after the second. By staggering the challenges, the likelihood of collisions with another vehicle's signals will be decreased. Moreover, in the event that there is a collision, the collision may not be repeated at least because the signals are being transmitted at differing intervals. The antenna 110, 112 may transmit the challenges in any number of random patterns as instructed by the controller 108 such that at least one challenge is transmitted every approximately 200 ms to 800 ms.

In another example, the pattern may be a time-shifted interval pattern beginning at a predefined point in time after the trigger event is recognized. That is, the challenge could "walk" for a certain period of time from the trigger event. For example, after a vehicle is turned off, the first challenge may be transmitted 50 ms thereafter. The first challenge may be transmitted at any point after the trigger event, although it would likely not shift more than 550 ms from the trigger event to assure relatively quick detection of the key fob 104 once it has entered the zone 114. The predefined time following the trigger event may be determined by the controller 108. It may be randomly assigned so as to increase the possibility that the challenges are offset from those of nearby vehicles. The challenges following the first, initial challenge may be transmitted at a predefined and equal interval thereafter, such as every 50 ms.

The system 100 may also include a second antenna 120 as shown in FIG. 1. The second antenna 120 may be distinct and separate from the first antennas 110, 112. The second antenna 120 may be, at least in part, included in a back-up receptacle within the vehicle 102. Such second antenna 120 within the back-up receptacle (not shown) may be used to both transmit and receive LF signals from a key fob 104 located therein and managed by the controller 108. This antenna and transceiver function may be necessary when the battery of a key fob 104 is low and its ability to transmit signals is hindered and therefore may already exist in the vehicle for such back-up purposes. To mitigate the LF interference problem, this second antenna 120 may also be configured to act as a low frequency transceiver capable of listening and detecting noise created by signals from outside the vehicle 102. That is, the second antenna 120 may be configured to detect challenges from nearby vehicles. The antenna 120 may transmit these challenges to the controller 108 which may in turn evaluate the challenges. Because the second antenna 120 may traditionally be used to detect low frequency signals from the key fob 104, the system 100 may also use this existing element to detect other low frequency signals. The controller 108 may be configured to subtract the challenges produced by the first antennas 110, 112 from the detected signals in order to have a clean sample of the outside, potentially interfering signals.

The controller 108 may then analyze the signals to recognize certain signal attributes. The signal attributes may include information about the signals detected by the second antenna 120 such as signal strength, frequency, and polling rate. The polling rate, as explained, may include the intervals at which the signal is being transmitted. That is, a nearby vehicle may be transmitting low frequency challenges every 50 ms. While the first antennas 110, 112 are described as transmitting the challenges, the second antenna 120 may also do so. Further, the first antennas 110, 112 may be capable of detecting outside signals from nearby vehicles, as well as transmit low frequency challenges. In doing so, the LF receiver function created with the door handle antenna would also be closer to the detection zone and would provide better performance.

Additionally or alternatively, the controller 108 may be configured to coordinate the current system 100 with the systems of other, nearby vehicles. The controller 108 may know what the other proximal scanning systems of the other vehicles are doing in order to establish the pattern and avoid interfering with these systems. For example, the controllers of each vehicle may communicate with each other using remote keyless entry messages (RKE messages). Each vehicle may include a global positioning system (GPS) having a clock. The GPS may be in communication with the controller 108 of the vehicle. As explained, each proximal scanning system of each vehicle may include at least one antenna 110, 112 configured to transmit low frequency challenges. The challenges may be transmitted at predetermined intervals as instructed by the associated controller. As explained, these challenges may be transmitted in response to a trigger event. The first challenge may be transmitted immediately following the trigger event. Additionally the first challenge may be transmitted at a predefined offset following the trigger event. The predefined offset may be at least one of 50, 100, 150 . . . 450, 500 or 550 ms from the nearest zero reading of the GPS clock after the trigger event (i.e., from t=0). That is, a vehicle may transmit the first challenge at a predefined offset from the trigger event and continue to transmit challenges thereafter at predefined increments, usually at least once every 600 ms. This recurring group of challenges may create a challenge cycle, or polling rate. The challenge cycle may be initiated with the first challenge and have recurring challenges at the predefined increments.

When a vehicle has transmitted at least one challenge based on the GPS clock, it may also send an RKE message. The RKE message may be transmitted from a separate ultra-high frequency (UHF) transceiver or one of the antennas 110, 112 and may be intended to be received by a nearby vehicle also equipped with proximity scanning functionality. The RKE message may include information such as the current location of the vehicle, as well as the predefined offset at which the first challenge is transmitted. When the nearby vehicle receives this information, it may use this information to establish the pattern for transmitting challenges so as to best avoid colliding with the challenges of the other vehicle. That is, the vehicle receiving the RKE message may determine when to transmit its challenges based on the known timing of the other vehicle's challenges and avoid the other vehicle's challenges. This process is described in more detail with respect to FIG. 4.

In situations where the GPS clock may be unavailable, either because the vehicle does not include GPS technologies or because the GPS clock cannot be accurately updated (e.g., the vehicle is in a location where GPS technologies are unavailable such as a parking structure or underground), a cellular clock of the vehicle could be used to determine the predefined offset at which the first challenge is transmitted. The vehicle location could be inferred based on the received RKE message's signal strength. A stronger signal strength may imply that the other vehicle is in close proximity to the first vehicle. This strength may be recognized by the controller 108 through an RSSI (received signal strength indicator).

Figure 4:
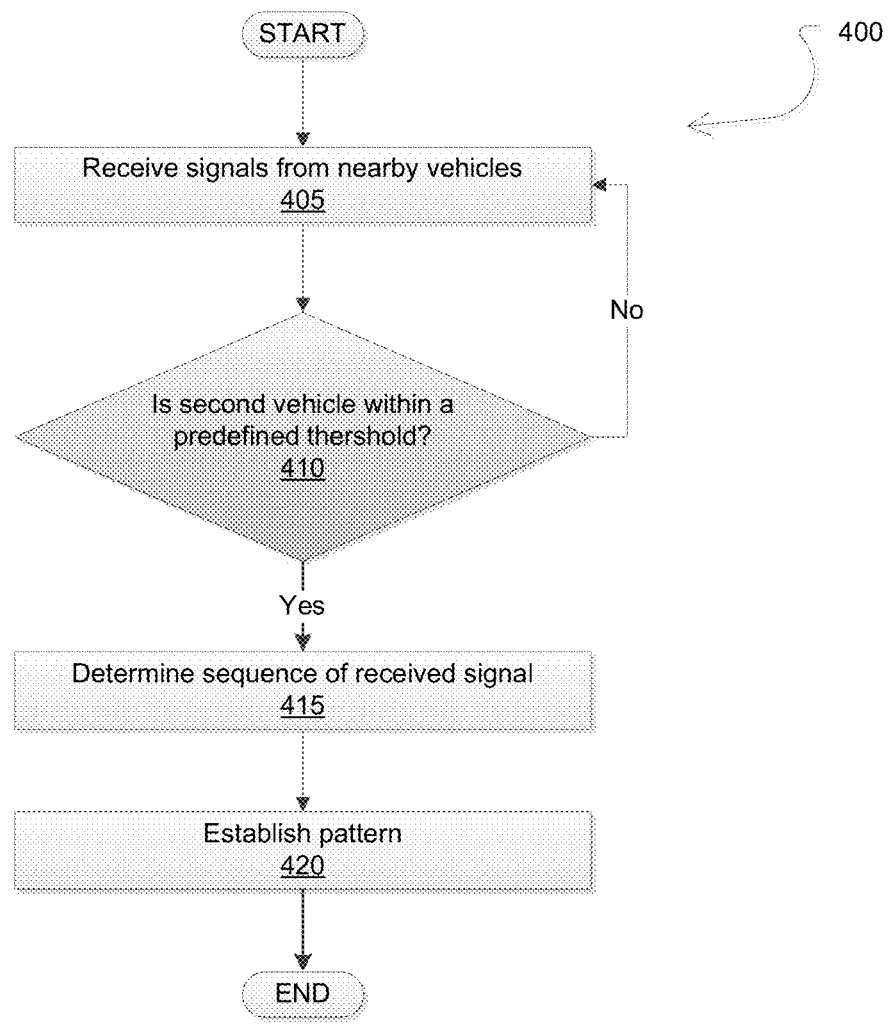
FIG. 4 is an exemplary flow chart for the proximity scanning system.

FIG. 4 shows an exemplary process 400 for establishing a pattern for the low frequency challenges for a first vehicle proximal scanning system. The process begins at block 405. In block 405, the first vehicle may receive second signals or second challenges, for use in their respective proximal scanning systems. The second low frequency signals may be at least one of RKE messages or low frequency challenges produced by the second vehicle, as explained above. These second signals may be received at one of the antennas 110, 112, 120 of the first vehicle and subsequently transmitted to the controller 108. The signals may indicate at least one of an offset, polling rate and location attribute. Once the controller 108 receives at least one signal, the process proceeds to block 410.

In block 410, the process 400 may determine whether at least one of the second vehicles are within a predetermined threshold/distance from the first vehicle based on the location attribute. For example, the threshold, which may be a predefined distance or signal strength, may be compared with the location attribute. In the example where the predetermined threshold is a distance between the first and second vehicles, the predefined threshold may be the distance at which collision of low frequency signals is likely to occur. That is, the zones 114 of each vehicle may be likely to overlap. For example, the predetermined distance may be ten (10) meters. This predetermined distance is used to establish a probability that the low frequency zones of each of the vehicles may overlap, thus creating the possibility of collision between each of their respective low frequency challenges. The distance between the two vehicles may be determined using the location attribute associated with the received signals. In one example, the RKE message may transmit the GPS coordinates (i.e. the location attribute) of the second vehicle. The controller may compare the first vehicle's position with the second vehicle position to determine the distance between the two.

The location attribute may also be the signal strength of the received second signal. As explained, a stronger signal strength may imply that the second vehicle is in close proximity to the first vehicle. If the second signal has a signal strength exceeding a predefined threshold, the controller 108 may determine that the second vehicle is within close enough proximity to the first vehicle to potentially cause interference/collision.

If the predefined threshold, albeit a distance or signal strength or any other form, is exceeded, the process proceeds to block 415. If not, the controller 108 has determined that the second signals are not likely to interfere with the first signals and the process 400 returns to block 405 and awaits another second signal to evaluate.

At block 415, the controller 108 determines the sequence of the second signal. The sequence may be a signal offset and a polling rate. The signal offset may be the time, measured from an initial reference time of t=0, that a low frequency challenge is sent. The polling rate may include the frequency at which the repeat low frequency signals are transmitted. That is, the controller may determine at what interval the proximity scanning system of the second vehicle is transmitting its challenges. In one example, the second vehicle may transmit challenges every 600 ms from t=0. The sequence may also be a random sequence. Once the sequence is determined, the process proceeds to block 420.

At block 420, the controller 108 establishes a first vehicle pattern in view of the detected second signals. The controller 108 may recognize that the second challenges are being transmitted every 600 ms from t=0 and may establish that the pattern may include transmitting challenges every 600 ms from t=100 ms, thus creating an offset from the second signal to avoid collisions. If the sequence of the second signal was determined to be random, then the pattern may also be established to be random to further decrease the likelihood that collision between challenges created by the first vehicle collide with the second challenges. The process may then end.

Process 400 may also take into account multiple vehicles having proximity scanning systems within a close proximity to the first vehicle. In one example, up to five (5) vehicles could be detected by the first vehicle, as shown in FIGS. 2 and 3. In this example, and for exemplary purposes only, the following signals could be detected:

| | | |
|---|---|---|
| Adjacent Vehicle 1, e.g. vehicle 102b: | 600 ms | t = 0 |
| Adjacent Vehicle 2, e.g. vehicle 102c: | 600 ms | T = 50 |
| Adjacent Vehicle 3, e.g. vehicle 102d: | 600 ms | t = 150 |
| Adjacent Vehicle 4, e.g. vehicle 102e: | 600 ms | t = 400 |
| Adjacent Vehicle 5, e.g. vehicle 102f: | 600 ms | t = 0 |
| First Vehicle, e.g. vehicle 102a: | 600 ms | t = 300 |

Thus, the controller 108 may establish a 600 ms pattern beginning at t=300 ms for the first vehicle to avoid collision with the neighboring systems. This is merely an exemplary situation. Multiple other scenarios are possible. For example, the polling rate of 600 ms may not be common among all the vehicles, especially if the vehicles are different makes and models. Moreover, the controller 108 may not be capable of avoiding all collisions, but may avoid most by taking into account the neighboring vehicle systems.

In some instances the polling rate may be altered by the controller 108. However, typical challenges may be transmitted for approximately 29 ms. If the polling rate is shortened, then more signals may be transmitted by the antenna 110, 112 and more 'air time' is taken up by the transmissions. By selecting an offset for the first vehicle to transmit low frequency challenges, the system 100 may coordinate the challenges among a group of closely parked vehicles to maintain relatively quick response times as well as avoid using up too much 'air time.'

Computing devices, such as the controller, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed as new and desired to be protected by Letters Patent of the United States is:

1. A system comprising:
   at least one first antenna;
   a second antenna configured to detect low frequency signals not produced by the first antenna;
   a controller in communication with the antennas and configured to:
      establish a pattern for transmitting low frequency challenges based on the low frequency signals; and
      instruct the first antenna to transmit the low frequency challenges based on the established pattern to avoid interference with the low frequency signals.

2. The system of claim 1, wherein the pattern is a random pattern.

3. The system of claim 2, wherein, based on the random pattern, the antenna transmits low frequency challenges at least once every approximately 200 milliseconds to 800 milliseconds.

4. The system of claim 1, wherein the pattern is a time-shifted interval pattern beginning at a predefined time after a trigger event, the trigger event being at least one of a vehicle turn-off indication and a vehicle lock indication.

5. The system of claim 4, wherein the predefined time is approximately 50 milliseconds after the trigger event and, based on the interval pattern, the antenna transmits the low frequency challenges at equal intervals from the predefined time.

6. The system of claim 1, wherein the controller is configured to determine at least one signal offset of at least one of the detected signals and establish the pattern to avoid the signal offset of the detected signal, the signal offset being measures from an initial reference time.

7. A method, comprising:
   receiving, at a computing device of a first vehicle, a signal from a second vehicle;
   determining a sequence of the received signal;
   establishing a pattern for transmitting low frequency challenges based on the sequence of the received signal, wherein the low frequency challenges avoid the determined sequence of the received signal; and
   instructing a first antenna to transmit the low frequency challenges based on the established pattern.

8. The method of claim 7, wherein the sequence includes a polling rate and offset, the signal offset being measured from an initial reference time.

9. The method of claim 8, wherein the pattern is a time-shifted interval pattern beginning at a predefined time after a trigger event, the predefined time differing from the offset.

10. The method of claim 9, wherein the antenna is instructed to transmit the low frequency challenges at equal intervals from the predefined time.

11. The method of claim 7, wherein the pattern is a random pattern.

12. The method of claim 11, wherein, based on the random pattern, the antenna transmits low frequency challenges at least once every approximately 200 milliseconds to 800 milliseconds.

13. A method, comprising:
   receiving, at a computing device of a first vehicle, a signal from a second vehicle;
   determining a location attribute of the second vehicle based on the received signal;
   determining whether the location attribute exceeds a predefined threshold; and
   in response to the location attribute exceeding the predefined threshold, establishing a pattern for transmitting low frequency challenges.

14. The method of claim 13, wherein the location attribute is at least one of a location coordinate and a signal strength.

15. The method of claim 13, wherein the received signal includes a sequence at which low frequency signals are transmitted from the second vehicle, the sequence having at least one of a polling rate and an offset measured from an initial reference time.

16. The method of claim 15, wherein the pattern is established based on the received signal to avoid the sequence of the second vehicle.

17. The method of claim 16, further comprising instructing a first antenna to transmit the low frequency challenges based on the established pattern.

18. The method of claim 13, wherein the pattern is a time-shifted interval pattern beginning at a predefined time after a trigger event, the predefined time differing from an offset.

* * * * *